(12) United States Patent
Khatri et al.

(10) Patent No.: US 12,481,711 B2
(45) Date of Patent: *Nov. 25, 2025

(54) SYSTEMS, APPARATUSES, AND METHODS FOR PROVIDING A QUALITY SCORE BASED RECOMMENDATION

(71) Applicant: eBay Inc., San Jose, CA (US)

(72) Inventors: Chandra Khatri, Atlanta, GA (US); Steven Hui Luan, Fremont, CA (US); Michael Tanaka, San Ramon, CA (US); Praveen K. Boinapalli, Pleasanton, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,754

(22) Filed: Oct. 2, 2023

(65) Prior Publication Data
US 2024/0028658 A1    Jan. 25, 2024

Related U.S. Application Data

(63) Continuation of application No. 14/586,462, filed on Dec. 30, 2014, now Pat. No. 11,809,501.

(60) Provisional application No. 62/043,064, filed on Aug. 28, 2014.

(51) Int. Cl.
*G06F 16/95* (2019.01)
*G06F 16/9535* (2019.01)

(52) U.S. Cl.
CPC ................ *G06F 16/9535* (2019.01)

(58) Field of Classification Search
CPC ............ G06F 16/9535; G06F 16/9536; G06F 16/9538
See application file for complete search history.

(56) References Cited

U.S. PATENT DOCUMENTS

| | | |
|---|---|---|
| 7,107,254 B1 | 9/2006 | Dumais et al. |
| 7,856,444 B2 | 12/2010 | Silverbrook et al. |
| 8,352,299 B1 * | 1/2013 | Seshadri ............ G06Q 30/0601 705/7.42 |
| 8,352,465 B1 | 1/2013 | Jing et al. |

(Continued)

OTHER PUBLICATIONS

"Explore Collections on eBay", eBay Inc., [Online]. Retrieved from the Internet: <URL:http://www.ebay.com/cln>, 10 pages.

(Continued)

*Primary Examiner* — Merilyn P Nguyen
(74) *Attorney, Agent, or Firm* — FIG. 1 Patents

(57) ABSTRACT

One or more of the systems, apparatuses, or methods discussed herein can include a quality score for a plurality of item listings or collections of item listings. Data sparseness can be avoided, as the quality score is based on inherent properties of the listing. An item listing can be recommended to a user based on the quality score. In one or more embodiments, a method can include determining a plurality of quality scores including a quality score for each of a plurality of item listings or a plurality of collections of item listings, the quality scores determined independent of a user's attributes and independent of the user's contextual information, the contextual information corresponding to details of the user's access to a website, and recommending an item listing or collection of item listings to a user based on the quality scores and the contextual information.

20 Claims, 12 Drawing Sheets

(56) References Cited

U.S. PATENT DOCUMENTS

| | | | |
|---|---|---|---|
| 8,831,987 B2 | 9/2014 | Knapp et al. | |
| 9,111,289 B2* | 8/2015 | Liu | G06Q 30/0276 |
| 11,809,501 B2 | 11/2023 | Khatri et al. | |
| 2007/0198485 A1* | 8/2007 | Ramer | G06F 16/9535 |
| 2008/0209339 A1* | 8/2008 | Macadaan | G06Q 30/0271 |
| | | | 715/745 |
| 2009/0165041 A1* | 6/2009 | Penberthy | H04N 21/25883 |
| | | | 725/34 |
| 2010/0082627 A1 | 4/2010 | Lai et al. | |
| 2011/0264663 A1 | 10/2011 | Verkasalo | |
| 2012/0059819 A1 | 3/2012 | Wheeler et al. | |
| 2012/0078873 A1* | 3/2012 | Ferrucci | G06F 16/3329 |
| | | | 707/E17.014 |
| 2012/0128239 A1 | 5/2012 | Goswami et al. | |
| 2012/0158516 A1* | 6/2012 | Wooten, III | G06Q 30/0269 |
| | | | 705/14.66 |
| 2012/0289147 A1 | 11/2012 | Raleigh et al. | |
| 2012/0323704 A1 | 12/2012 | Steelberg et al. | |
| 2013/0073335 A1* | 3/2013 | Tang | G06Q 30/02 |
| | | | 705/7.29 |
| 2013/0151383 A1 | 6/2013 | Gancarz et al. | |
| 2013/0225439 A1 | 8/2013 | Princen et al. | |
| 2013/0311408 A1* | 11/2013 | Bagga | G06Q 30/02 |
| | | | 706/12 |
| 2013/0346234 A1 | 12/2013 | Hendrick et al. | |
| 2014/0040245 A1 | 2/2014 | Rubinstein et al. | |
| 2014/0067596 A1* | 3/2014 | McGovern | G06Q 30/0246 |
| | | | 705/26.7 |
| 2014/0079297 A1 | 3/2014 | Tadayon et al. | |
| 2014/0106785 A1 | 4/2014 | Hawkins et al. | |
| 2014/0108427 A1 | 4/2014 | Spiegel | |
| 2014/0181193 A1 | 6/2014 | Mukund et al. | |
| 2014/0229293 A1* | 8/2014 | Huang | G06Q 30/0631 |
| | | | 705/14.69 |
| 2014/0279196 A1 | 9/2014 | Wilson et al. | |
| 2014/0321761 A1 | 10/2014 | Wang et al. | |
| 2015/0142566 A1 | 5/2015 | Zhang et al. | |
| 2016/0063065 A1 | 3/2016 | Khatri et al. | |
| 2016/0078035 A1* | 3/2016 | Ball | G06F 16/248 |
| | | | 707/728 |
| 2016/0344758 A1* | 11/2016 | Cohen | H04L 63/145 |
| 2020/0311790 A1* | 10/2020 | Keren | G06Q 20/4016 |
| 2021/0337460 A1* | 10/2021 | Breaux, III | H04W 8/18 |

OTHER PUBLICATIONS

U.S. Appl. No. 14/586,462, , "Advisory Action Received for U.S. Appl. No. 14/586,462, mailed on May 27, 2020", May 27, 2020, 3 pages.
U.S. Appl. No. 14/586,462, , "Advisory action received for U.S. Appl. No. 14/586,462 , mailed on Apr. 11, 2019", Apr. 11, 2019, 3 pages.
U.S. Appl. No. 14/586,462, , "Advisory Action received for U.S. Appl. No. 14/586,462 mailed on Aug. 15, 2022", Aug. 15, 2022, 3 pages.
U.S. Appl. No. 14/586,462, , "Applicant Initiated Interview Summary Received for U.S. Appl. No. 14/586,462, mailed on Jan. 21, 2020", Jan. 21, 2020, 3 pages.
U.S. Appl. No. 14/586,462, , "Applicant Initiated Interview Summary Received for U.S. Appl. No. 14/586,462, mailed on May 18, 2020", May 18, 2020, 3 pages.
U.S. Appl. No. 14/586,462, , "Applicant Initiated Interview Summary received for U.S. Appl. No. 14/586,462, mailed on Feb. 19, 2019", Feb. 19, 2019, 3 pages.
U.S. Appl. No. 14/586,462, , "Applicant-Initiated Interview Summary received for U.S. Appl. No. 14/586,462, mailed on Sep. 11, 2018", Sep. 11, 2019, 3 pages.
U.S. Appl. No. 14/586,462, , "Final Office Action received for U.S. Appl. No. 14/586,462, mailed on Apr. 13, 2021", Apr. 13, 2021, 20 pages.
U.S. Appl. No. 14/586,462, , "Final Office Action received for U.S. Appl. No. 14/586,462, mailed on Aug. 4, 2017", Aug. 4, 2017, 27 pages.
U.S. Appl. No. 14/586,462, , "Final Office Action received for U.S. Appl. No. 14/586,462, mailed on Jan. 25, 2019", Jan. 25, 2019, 14 pages.
U.S. Appl. No. 14/586,462, , "Final Office Action Received for U.S. Appl. No. 14/586,462, mailed on Mar. 20, 2020", Mar. 20, 2020, 16 pages.
U.S. Appl. No. 14/586,462, , "Final Office Action Received for U.S. Appl. No. 14/586,462, mailed on Mar. 24, 2023", Mar. 24, 2023, 20 pages.
U.S. Appl. No. 14/586,462, , "Final Office Action Received for U.S. Appl. No. 14/586,462, mailed on May 20, 2022", May 20, 2022, 22 pages.
U.S. Appl. No. 14/586,462, , "Non Final Office Action Received for U.S. Appl. No. 14/586,462, mailed on Oct. 30, 2020", Oct. 30, 2020, 17 pages.
U.S. Appl. No. 14/586,462, , "Non-Final Office Action received for U.S. Appl. No. 14/586,462, mailed on Feb. 10, 2017", Feb. 10, 2017, 39 pages.
U.S. Appl. No. 14/586,462, , "Non-Final Office Action received for U.S. Appl. No. 14/586,462, mailed on Jul. 2, 2018", Jul. 2, 2018, 30 pages.
U.S. Appl. No. 14/586,462, , "Non-Final Office Action Received for U.S. Appl. No. 14/586,462, mailed on Oct. 5, 2022", Oct. 5, 2022, 20 pages.
U.S. Appl. No. 14/586,462, , "Notice of Allowance", U.S. Appl. No. 14/586,462, Aug. 9, 2023, 18 pages.
Adomavicius, et al., "Context-Aware Recommender Systems", Recommender Systems Handbook, 2011, 217-253.
Adomavicius, et al., "Context-Aware Recommender Systems", Artificial Intelligence Magazine, 32(3), 2011, 67-80.
Adomavicius, et al., "Incorporating Contextual Information in Recommender Systems Using a Multidimensional Approach", ACM Transactions on Information Systems, 23(1), Jan. 2005, 103-145.
Adomavicius, Gediminas et al., "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.
Anand, et al., "Contextual Recommendation", From Web to Social Web: Discovering and Deploying User and Content Profiles, Lecture Notes in Computer Science, vol. 4737, 2007, 142-160.
Bal Trunas, et al., "Context relevance assessment and exploitation in mobile recommender systems", Personal and Ubiquitous Computing, 16(5), Jun. 2012, 507-526.
Bazire, et al., "Understanding Context Before Using It", Modeling and Using Context, Lecture Notes in Computer Science, 3554, 2005, 29-40.
Cao, et al., "Learning to Rank: From Pairwise Approach to Listwise Approach", Proceedings of the 24th international conference on Machine learning, Jun. 2007, pp. 129-136.
Donovan, et al., "Trust in Recommender Systems", Proceedings of the 10th international conference on Intelligent user interfaces, Jan. 2005, pp. 167-174.
Herlocker, et al., "Evaluating collaborative filtering recommender systems", ACM Transactions on Information Systems, 22(1), 2004, 5-53.
Jannach, et al., "Recommender Systems: An Introduction", Retrieved from the Internet : <https://pdfs.semanticscholar.org/6abf/b1fbb04f1570e646cc8f9efeaad7d98a7495.pdf>, 2010, 16 pages.
Karatzoglou, et al., "Multiverse Recommendation: N-Dimensional Tensor Factorization for Context-Aware Collaborative filtering", RecSys '10 Proceedings of the fourth ACM conference on Recommender systems, 2010, 79-86.
Karatzoglou, , "Recommender Systems", ESSIR 2013, Sep. 6, 2013, 145 pages.
Liu, N et al., "Social Temporal Collaborative Ranking for Context Aware Movie Recommendations", ACM Transactions on Intelligent Systems and Technology (TIST), 4(1), 2013, 15:1-15:26.

(56) References Cited

OTHER PUBLICATIONS

Panniello, et al., "Experimental Comparison of Pre- Versus Post Filtering Approaches in Context-Aware Recommender Systems", Proceedings of the 2009 ACM Recommender Systems Conference, 2009, 265-268.

Pazzani, et al., "Content-Based Recommendation Systems", The Adaptive Web, Lecture Notes in Computer Science, vol. 4321, 2007, 325-341.

Rendle, Steffen et al., "Fast Context-aware Recommendations with Factorization Machines", SIGIR 11 Proceedings of the 34th international ACM SIGIR conference on Research and development in Information Retrieval, Jul. 24, 2011, 10 pages.

Ricci, et al., "Recommender Systems Handbook", Retrieved from the Internet URL : <https://rd.springer.com/book/10.1007/978-0-387-85820-3>, May 2010, 29 pages.

Salakhutdinov, et al., "Restricted Boltzmann Machines for Collaborative Filtering", Proceedings of the 24th international conference on Machine learning, Jun. 2007, pp. 791-798.

Sarwar, Badrul et al., "Item-Based Collaborative Filtering Recommendation Algorithms", In Proceedings of WWW10, Available at <http://citeseerx.ist.psu.edu/viewdoc/download;jsessionid=53CDC5DC7FF8F88183770CD0C72DD017?doi=10.1.1.167.7612&rep=rep1&type=pdf>, 2001, 11 pages.

Schafer, et al., "Recommender Systems In E-Commerce", Proceedings of the 1st ACM conference on Electronic commerce, Nov. 1999, pp. 158-166.

Shi, et al., "Ranking and Context-awareness in Recommender Systems", PHD Thesis, Institutional Repository, TU Delft. Entry 1 of 3, 2013, 177 pages.

Shi, , "Ranking and Context-awareness in Recommender Systems", PHD Thesis, Institutional Repository, TU Delft. Entry 2 of 3., 2013, 177 pages.

Shi, , "Ranking and Context-awareness in Recommender Systems", PHD Thesis, Institutional Repository, TU Delft. Entry 3 of 3., 2013, 177 pages.

Sinha, et al., "Beyond Algorithms: An HCI Perspective on Recommender Systems", Retrieved from the Internet URL: <http://citeseerx.ist.psu.edu/viewdoc/summary?doi=10.1.1.23.9764>, 2001, 11 pages.

Tan, Pang-Ning et al., "Introduction to Data Mining", Mining, (First Edition). Addison-Wesley Longman Publishing Co., Inc., Boston, MA, USA. (2005), 2005, 169 pages.

Verbert, et al., "Context-Aware Recommender Systems for Learning: A Survey and Future Challenges", Journal of Universal Computer Science, 16(16), 2010, 18 pages.

\* cited by examiner

| METHOD USED | CONTEXTUAL MODELING | | | WITHOUT CONTEXT | | |
|---|---|---|---|---|---|---|
| | ROC | RMSE | TIME(S) | ROC | RMSE | TIME(S) |
| LOGISTIC REGRESSION | 0.86 | 0.34 | 142 | 0.78 | 0.48 | 15 |
| STOCHASTIC GRADIENT DESCENT | 0.85 | 0.36 | 6.5 | 0.76 | 0.50 | 8 |
| GAUSSIAN NAÏVE BAYES | 0.80 | 0.41 | 18 | 0.75 | 0.50 | 18 |
| RANDOM FOREST | 0.89 | 0.32 | 92 | 0.75 | 0.51 | 83 |
| ADABOOST | 0.87 | 0.36 | 631 | 0.76 | 0.49 | 547 |

*FIG. 7*

| METHOD USED | CONTEXTUAL MODELING | | | WITHOUT CONTEXT | | |
|---|---|---|---|---|---|---|
| | ROC | RMSE | TIME(S) | ROC | RMSE | TIME(S) |
| LOGISTIC REGRESSION | 0.63 | 0.62 | 910 | 0.59 | 0.65 | 254 |
| STOCHASTIC GRADIENT DESCENT | 0.65 | 0.60 | 190 | 0.58 | 0.65 | 182 |
| GAUSSIAN NAÏVE BAYES | 0.62 | 0.64 | 488 | 0.60 | 0.65 | 463 |
| RANDOM FOREST | 0.75 | 0.51 | 3962 | 0.68 | 0.55 | 3287 |
| ADABOOST | 0.69 | 0.56 | 10231 | 0.64 | 0.59 | 8945 |

*FIG. 8*

| METHOD USED | CONTEXT PRE-FILTER | | | CONTEXT POST-FILTER | | |
|---|---|---|---|---|---|---|
| | ROC | RMSE | TIME(S) | ROC | RMSE | TIME(S) |
| LOGISTIC REGRESSION | 0.90 | 0.31 | 147 | 0.90 | 0.29 | 126 |
| STOCHASTIC GRADIENT DESCENT | 0.86 | 0.35 | 9.7 | 0.88 | 0.32 | 8.4 |
| GAUSSIAN NAÏVE BAYES | 0.81 | 0.44 | 21 | 0.85 | 0.39 | 17 |
| RANDOM FOREST | 0.89 | 0.33 | 97 | 0.91 | 0.31 | 83 |
| ADABOOST | 0.88 | 0.34 | 647 | 0.91 | 0.30 | 562 |

FIG. 9

SYSTEMS, APPARATUSES, AND METHODS FOR PROVIDING A QUALITY SCORE BASED RECOMMENDATION

RELATED APPLICATIONS

This application is a continuation of U.S. application Ser. No. 14/586,462, entitled "SYSTEMS, APPARATUSES, AND METHODS FOR PROVIDING A QUALITY SCORE BASED RECOMMENDATION," filed on Dec. 30, 2014, which claims the benefit of priority under 35 U.S.C. Section 119(e) to U.S. Provisional Patent Application Ser. No. 62/043,064, entitled "SYSTEMS, APPARATUSES, AND METHODS FOR PROVIDING A RANKING BASED RECOMMENDATION," filed on Aug. 28, 2014, each of which is incorporated herein by reference in its entirety.

TECHNICAL FIELD

The present disclosure relates generally to providing a recommendation to a user and more specifically to providing a recommendation using a quality score and/or making a recommendation context-aware.

BACKGROUND

Recommendation systems (RSs) have been in thee-Commerce industry for more than a decade. Conventional RSs, such as Collaborative Filtering (CF) and Content Based (CB) based RSs include many drawbacks. CF and CB alone do not incorporate contextual information. For better personalization and user experience Context Aware Recommendation Systems (CARS s) were introduced. Most of the existing CARSs are built on top of conventional CF or CB models. The CARSs have drawbacks as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 7 illustrates, by way of example, a table of simulation results of contextual modeling using attributes at a collections level.

FIG. 8 illustrates, by way of example, a table of simulation results of contextual modeling using attributes at a session level.

FIG. 9 illustrates, by way of example, a table of simulation results comparing contextual pre-filtering to contextual post-filtering.

DETAILED DESCRIPTION

Figure 1:
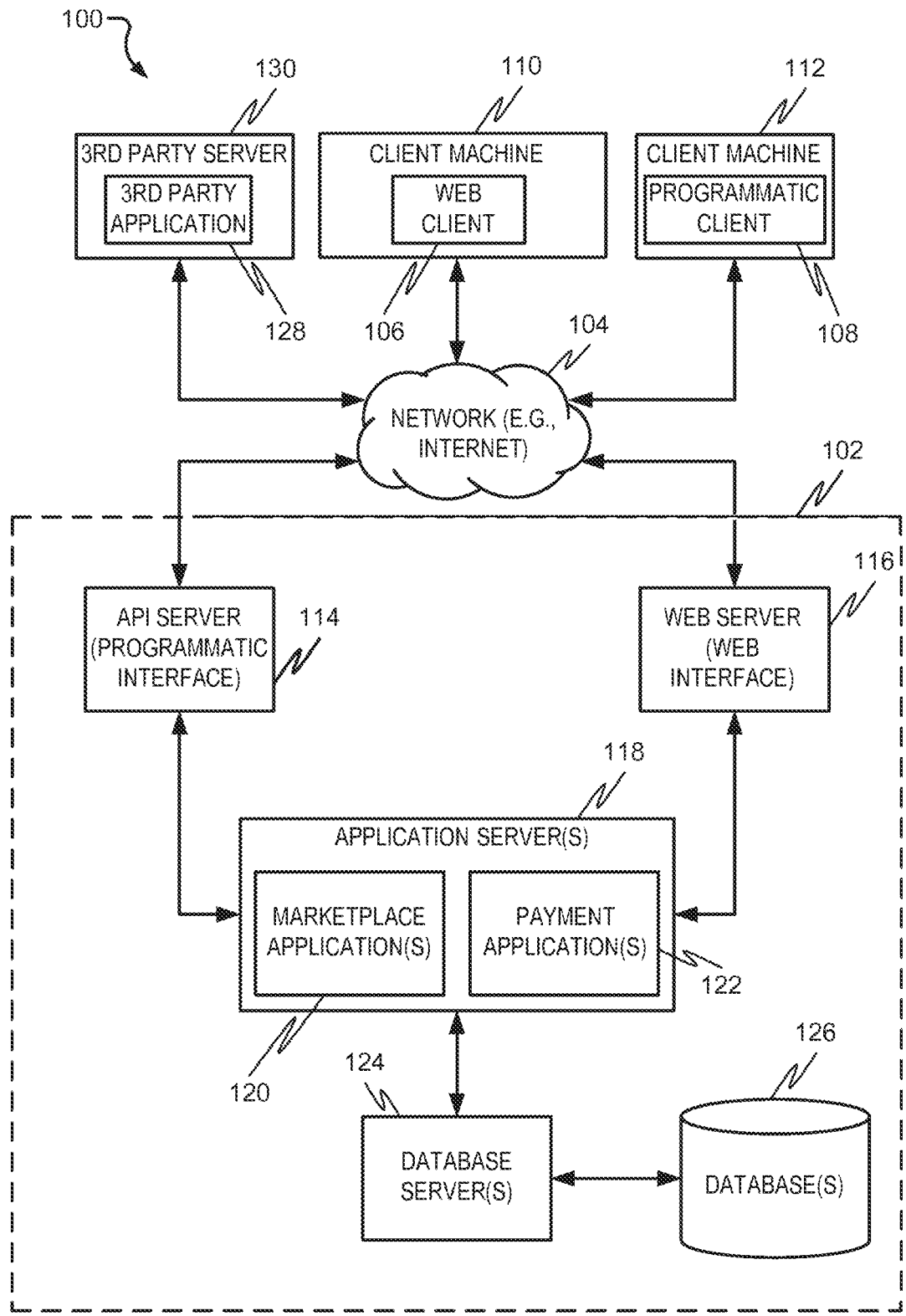
FIG. 1 illustrates, by way of example, a network diagram depicting a client-server system, within which one or more embodiments may be deployed.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the subject matter. It will be evident, however, at least to those skilled in the art, that embodiments of the subject matter may be practiced without one or more these specific details.

In one or more embodiments, a personalized recommendation is provided to a user through the use of various techniques. The personalized recommendation can be provided using a quality score ranking technique and/or using context information associated with a user's access to a website to filter item listings (e.g., listings of individual item listings or collections of item listings) prior to presenting the item listing to a user. The item listings can include one or more products for sale, a service offering, or an advertisement for a product or service, among other item listings.

RSs have become important tools in personalized marketing. The existing systems are usually based on CF, CB, or a combination of both (Hybrid). Some RSs integrate machine learning techniques with hybrid systems in the hopes of avoiding drawbacks of CF/CB systems. Such machine learning techniques assist in making the recommendation more customized, but require an increase in computer resources and increase an amount of time it takes to provide a recommendation to a user. As used herein "recommending" or "recommendation" mean displaying an item listing to a user, such as under a heading indicating that the user might be interested in the item listing.

In CF, recommendations are determined using techniques that involve collaboration among multiple agents. These agents can be users. The agents rate some item listing and then, based on some similarity function that determines a similarity between agents, recommendations are made to similar users (e.g., users with some characteristic, such as a demographic, a preference, purchase history, or other characteristic in common). In CB, recommendations are made using the content of item listings by providing a recommendation for an item listing similar to an item listing the agent viewed or an item listing the agent purchased, for example, and are independent of an agent's opinion(s) (e.g., rating(s) of the item listings/item listings as in CF RSs).

CF and CB recommendation methods have many drawbacks. CF and CB recommendation methods do not incorporate the context of the agents visit to an item listing. Context can be defined as the state of a user. Context information can be used in different ways with respect to a recommendation. Context information is different from user attributes that are inherent to a user. User attributes can include user preferences, demographics, purchase history, or the like.

The following are some limitations and challenges with including personalization in CF or CB RSs. Both CF and CB have data sparseness challenges. Using CF, few data points per user leads to very few recommendations. Using both CF and CB, when there is no data for a user, new item listings are not recommended well (a so called "Cold Start"). In CF, there are many item listings to choose from and information may not be available for a sufficient number of users, making the recommendation not very personalized. Some methods have been developed to deal with sparseness. Sparseness can be dealt with using singular value decomposition, matrix factorization, or clustering, each of which is computationally very expensive, leads to information loss, and produces bad recommendations for niche categories of item listings or collections, and/or does not recommend a niche category at all. A bad recommendation can include an irrelevant recommendation to the user or a recommendation that is repugnant to a user, among other bad recommendations.

Other drawbacks of both CF and CB include similarity computations being time consuming, $O(n^2)$ with an n sized sample, CF tends to become popularity biased, there is a problem as to what to recommend with new item listings using CF, and an absence of context leads to bad recommendations if two or more different users use an account. Further drawbacks include a difficulty in incorporating ratings and quality judgments of other users using CB, diversity is difficult to implement using CB, and there is limited content information, so discrimination among item listings is difficult if not impossible in CB.

In general, both CF and CB recommendations use item listing-level listing characteristics or an agent's historical information or ratings for recommending additional item listings to a user. Contextual features, in contrast, are specific to a session or the context in action of the agent. For example, a contextual feature can include what kind of device is being used currently to access content (e.g., desktop, mobile/tablet), what time the access is occurring (e.g., a weekday/weekend/day time/nighttime), etc. Contexts are dynamic, and they can change frequently with respect to the agent. Contextual information can change the way item listings are recommended as compared to the way item listings are recommended in a CF and a CB system.

The subject matter discussed herein can help improve over the prior RSs. The subject matter is applicable to virtually any RS and recommendation method. The subject matter discussed herein can provide a recommendation in an RS that uses collections of item listings. A collection of item listings is a group of item listings that are grouped together based on a common theme. The collection of item listings can be treated as a single item listing in that it the item listing collection can receive a single quality score based on one or more item listings of the collection. The discussion of embodiments of RSs begins with a discussion of a networked system in which an RS may be deployed.

FIG. 1 illustrates, by way of example, a block diagram of an embodiment of a network diagram depicting a client-server system 100, within which one or more RS embodiments may be deployed. A networked system 102, in the example form of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Washington State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The databases 126 can include information stored thereon regarding item listings that can be recommended to a user. The item listings can include tags, such as can include a quality score tag that indicates a quality score of the item listing, a contextual information tag that indicates contextual information that is consistent with the item listing, or other tag. The database 126 can include information regarding item listings to be recommended to a user that are pre-computed offline (e.g., when the user is not online).

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed architecture, or a peer-to-peer architecture system, for example. The various marketplace and payment applications 120 and 122 can also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, California) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
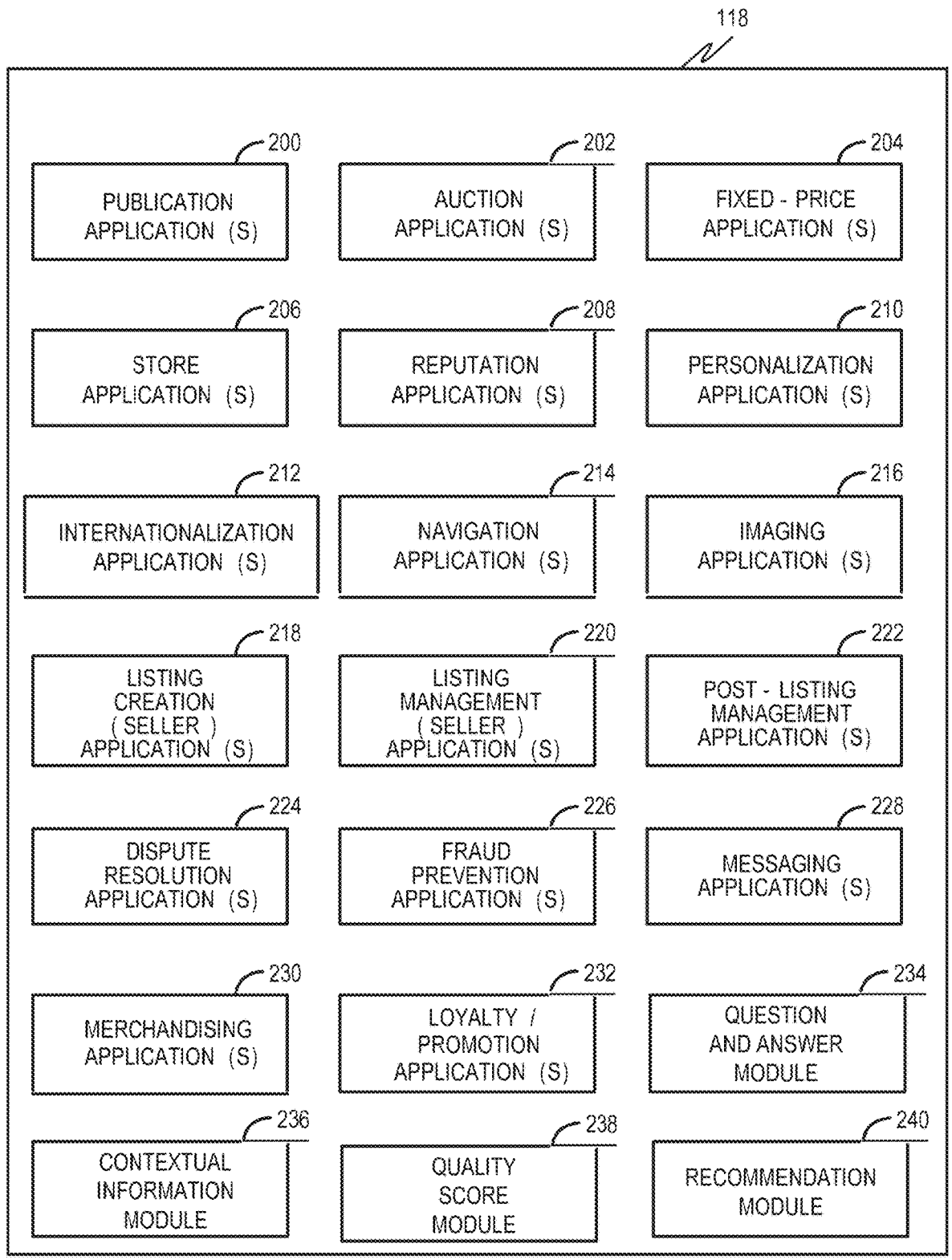
FIG. 2 illustrates, by way of example, a block diagram of marketplace and payment applications and that, in one or more embodiments, are provided as part of application server(s) 118 in the networked system.

FIG. 2 is a block diagram illustrating marketplace and payment applications 120 and 122 that, in one or more embodiments, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted item listings.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and may be offered a reward for which accumulated loyalty points can be redeemed.

The question and answer module 234 provides one or more users a communication medium. The question and answer module 234 can be used, for example, to provide customer support to users, answer user questions regarding products or services offered in an auction or other listing, or provide a feedback mechanism for users to review a product or service, provide information to other users, or provide information about them.

The contextual information module 236 can determine a context of a user's access to a website. The contextual information module 236 can analyze message or packet traffic from the client. The contextual information module 236 can receive information from the database server 124 indicating item listings that a user might be interested in. The contextual information module 236 can rank the item listings from the database server 124 based on the contextual information.

The quality score module 238 can determine a quality score of an item listing, such an item listing indexed in the database 126. The quality score module 238 can consider an item listing freshness (i.e. how recently the item listing was put on sale or posted for sale on the network), an item listing quality (i.e. a condition of the item listing, such as new, like new, good, slightly used, used, poor, etc.), an image quality (e.g., resolution, clarity, etc. of the image), cover item listing quality (in the case that the item listing is a collection of item listings), a cover image quality (in the case that the item listing is a collection of item listings), a mean item listing quality (e.g., an average of the highest quality item listings of a collection of item listings), a mean image quality (e.g., an average of the highest quality images of a collection of item listings), a number of item listings in the collections of item listings, an item listing age, an item listing last update time/date, a number of user item listing views, a number of user follows, a number of user unfollows, a number of user shares, user engagement with the item listing, and/or an author of the item listing, among others.

A recommendation module 240 can receive information, such item listing rankings, a quality score, user attributes, and/or contextual information associated with a device a user is using to access the website and recommend an item listing to a user based on the received information. The recommendation module 240 can implement a random forest classifier or other technique in determining the item listing to be recommended.

Figure 3:
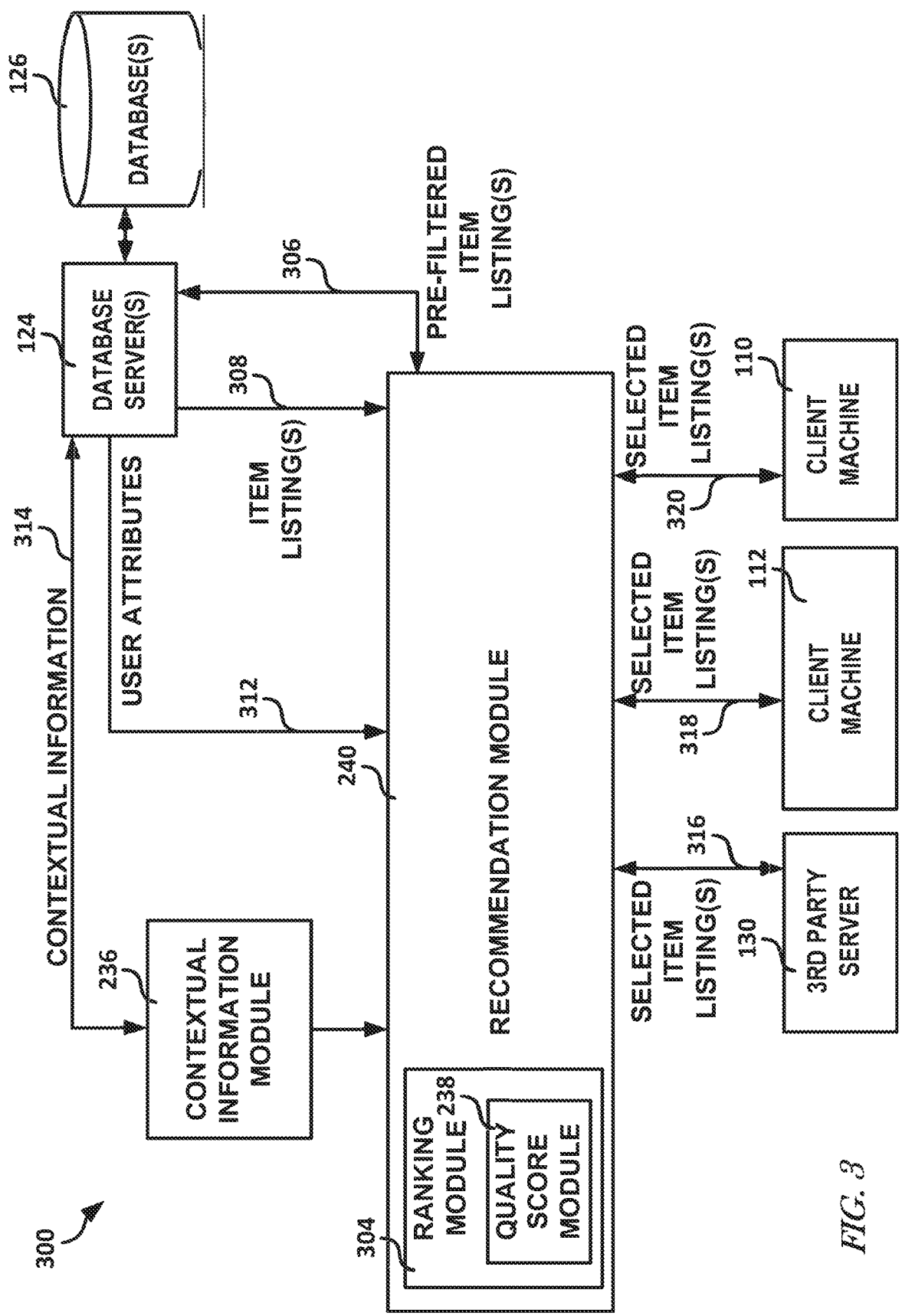
FIG. 3 illustrates, by way of example, a block diagram of an embodiment of a recommendation system that, in one or more embodiments, is provided as part of the application server(s) 118 and/or the networked system.

FIG. 3 illustrates, by way of example, an embodiment of an RS 300. The RS 300 as illustrated includes a recommendation module 240, one or more databases 126, one or more database servers 124, an optional contextual information module 236, one or more client machines 112 or 110, and/or one or more $3^{rd}$ party servers 130. The client machines 110 or 112 can issue a request to the network 104 (not shown in FIG. 3, see FIG. 1) that can be reformatted by the web server 116 or the API 114. The contextual information module 236 can analyze the request and determine contextual information of a user's access to the network 104. By analyzing the request from the client machine 112 or 110 contextual information, such as a device type (e.g., mobile, laptop), a make and/or model of the device, an OS, a browser, or the like, can be determined. The contextual information can be provided directly to the recommendation module 240 by the contextual information module 236 and/or the contextual information can be stored to the database(s) 126, such as through a communication the database server 124 through the connection 314.

The selected item listing(s), selected by the recommendation module 240 and to be presented to the user, can be communicated to the client machine 110 or 112, or the $3^{rd}$ party server 130, through the connections 320, 318, and 316, respectively. The recommended item listing(s) (i.e. the selected item listing(s)) can be communicated to the web server 116 or API 114, which can then communicate the selected item listing(s) to the network 104, which can communicate with the client machine 110 or 112 to cause the machine to display an image of the selected item listing(s).

Item listings, user attributes, user contextual information, and/or pre-filtered item listing(s) can be stored and indexed in the database(s) 126. The recommendation module 240 can retrieve contextual information from the database 126 through the connection 314, user attributes from the database 126 through the connection 312, item listing(s) from the database 126 through the connection 308, and can retrieve pre-filtered item listing(s) through the connection 306.

The user attributes 312 can be provided by the user, such as through the client 110 or 112 and/or the question and answer module 234. The contextual information 310 can be determined by analyzing data traffic between the client 110 or 112 and the network 104, web server 116, or API server 114. For example, a MAC address may indicate a device type, browser, time or other contextual information associated with a user's access the network 104.

Item listing(s) can either be selected online or offline. Online meaning that a recommendation technique to determine a recommendation for a given user can be performed after the given user has accessed the network 104, and offline meaning that the recommendation technique is performed so that an item recommendation is pre-computed for the given user independent of a user's access to the network 104. To help in performing the recommendation technique offline, pre-filtered item listing(s) can be stored and indexed (i.e. catalogued) in the database(s) 126. The catalogued pre-filtered item listing(s) can be retrieved from the database (s) 126, such as through the connection 306. The pre-filtered item listing(s) can include item listing(s) filtered through one or more of the quality score module 238, the ranking module 304, or the recommendation module 240. The pre-filtered item listing(s) can be filtered based on one or more of the quality score, the user attributes, and the contextual information. If the pre-filtered item listings are filtered based on user attributes only, then the quality score module 238 and the ranking module 304 can be used to filter the pre-filtered item listings based on the quality score and the recommendation module 240 can filter the pre-filtered item listings based on the quality score. If the pre-filtered item listings are pre-filtered based on the quality score, then the recommendation module 240 can further filter the pre-filtered items based on the contextual information and the user attributes if the user attributes are available. Pre-filtering based on quality score can include using the ranking module 304 and the quality score module 238 to determine a quality score and rank the item listing(s) based on the quality score. Pre-filtering based on the quality score can include comparing the quality score to a threshold and removing an item listing that is less than the threshold.

Data has shown that an agent tends to buy more item listings using a desktop, but engages more with a recommended item listing using a mobile device. If the contextual information, such as can be communicated on the connection 314, is considered in providing a recommendation, then the item listings that cause more engagement can be displayed to a user when they are on tablet, laptop, or a mobile, while item listings that a user might be interested in buying would be presented to the user when they are using a desktop computer. The item listings and the collection listing can be tagged to indicate whether they are for user engagement or purchase, for example. Other tags for the item listings or collection listings can include, for example, operating system (OS), device type, user type (e.g., buyer, seller, administrator, or the like), user buyer segment, user seller segment, user demographics, time, session source type, and/or is owner. The tags for the item listings or collection listings can indicate user attributes of users that might be interested in engaging with or purchasing the item listing or collection of item listings. Thus, if contextual information of one user matches more tags of an item listing than another item listing, the item listing that includes more matching tags can be ranked higher in terms of contextual match than the item listing that includes fewer matching tags.

For example, a user using Internet Explorer to access the web server 116 may be more likely interested in Microsoft item listings than Macintosh item listings, so Microsoft item listings can include a browser tag of "Internet Explorer". Similarly, a user using Safari to access the web server 116 may be more likely interested in Macintosh item listings, so Macintosh item listings can include a browser tag of "Safari".

The recommendation module 240 can include a ranking module 304. The ranking module 304 can receive data indicating one or more collections of item listings 306 or one or more item listing(s) 308 that could potentially be recommended to a user. The data can include information describing the item listings 306 or collections of item listings 308, such as a unique identifier. The data can include data depicted in Table 2, among other data. The ranking module 304 can include the quality score module 238.

The quality score module 238 can use a relevant classifying technique that provides the rank for each item or collection of items. The classifying technique can include a random forest classifier, logistic regression, stochastic gradient descent, Gaussian naïve Bayes, Adaboost, or other technique to determine quality scores based on the received data. The quality scores can be used to provide a rank of an item listing or a collection. For example, the item listing or collection with the highest relative quality score can be ranked highest (e.g., associated with a number one) and the item listing or collection with the lowest relative score can be ranked lowest (e.g., associated with a larger number).

The ranking module 304 can extract features from a collection/item listing using a feature importance technique (e.g., information gain, entropy, random forest, among others). The relative rank of each feature can be determined by obtaining the depth of the random forest classifier generated while using each attribute as a decision node. Less depth can imply more importance.

Figure 4:
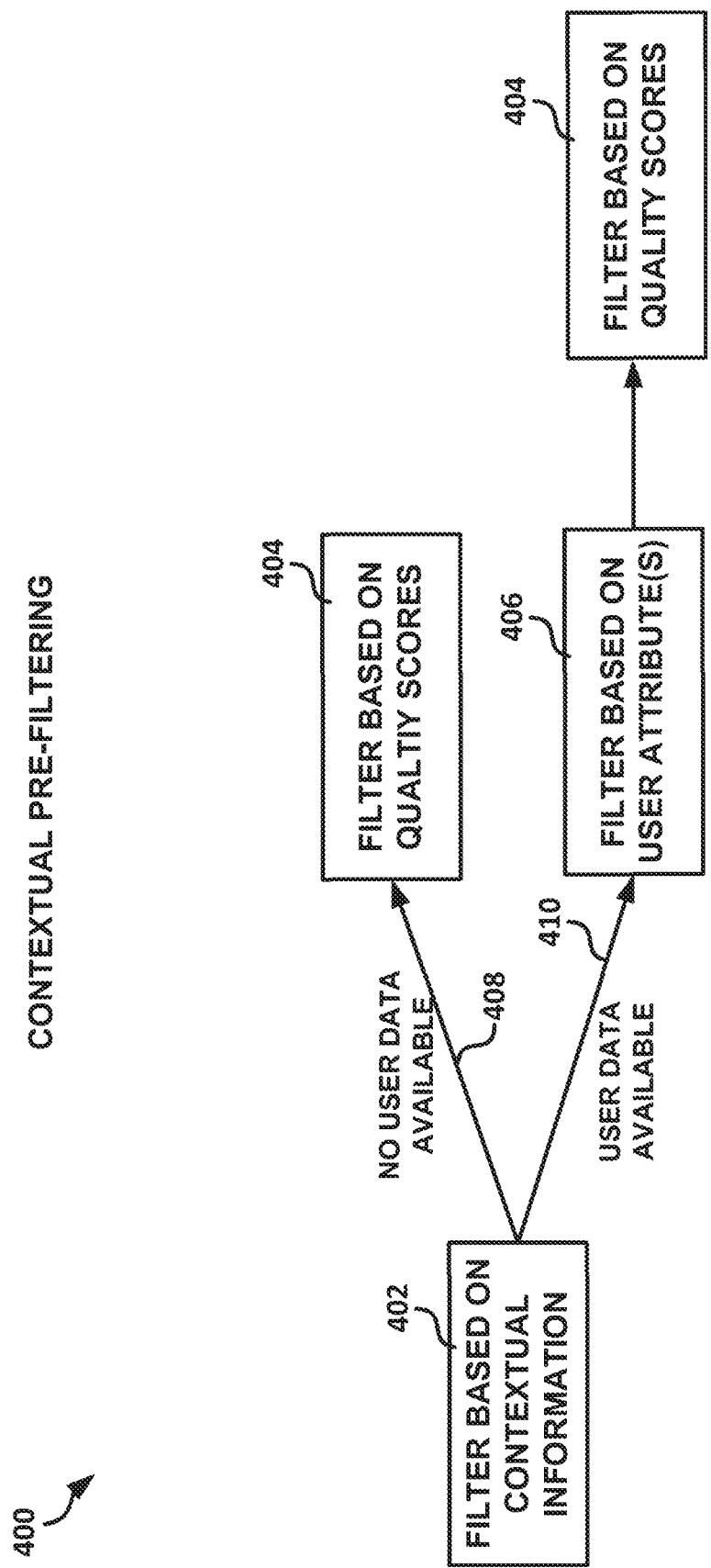
FIG. 4 illustrates, by way of example, a flow diagram of an embodiment of a method of contextual pre-filtering.

The recommendation module 240 can consider the quality score and/or the rank of the item listings in providing a recommendation of the item listings. The recommendation module 240 can rank potential item listings based on contextual information 310 (e.g., one or more of the item listings listed in Table 1) or user attributes 312 before providing the recommendation. The quality score from the quality score module 238, the contextual information 310, and the user attributes 312 can be used to filter (e.g., rank) the item listings in a variety of orders, such as can produce different results. Three ways that are discussed herein include: (i) contextual pre-filtering (FIG. 4); (ii) contextual post-filtering (FIG. 5); and (iii) contextual modeling (FIG. 6). The recommendation module 240 can recommend an item listing/collection using any of the techniques discussed herein, including contextual pre-filtering (technique 400), contextual post-filtering (technique 500), and contextual modeling (technique 600).

Figure 5:
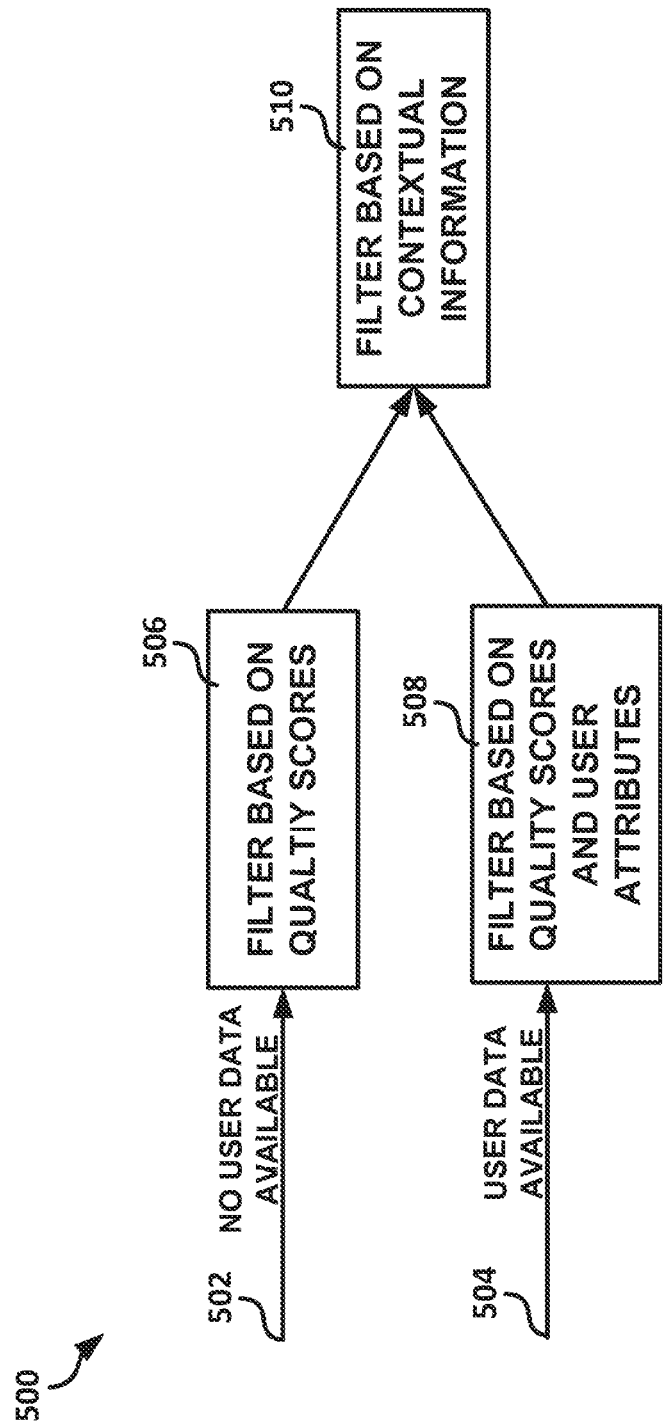
FIG. 5 illustrates, by way of example, a flow diagram of an embodiment of a method of contextual post-filtering.
Figure 6:
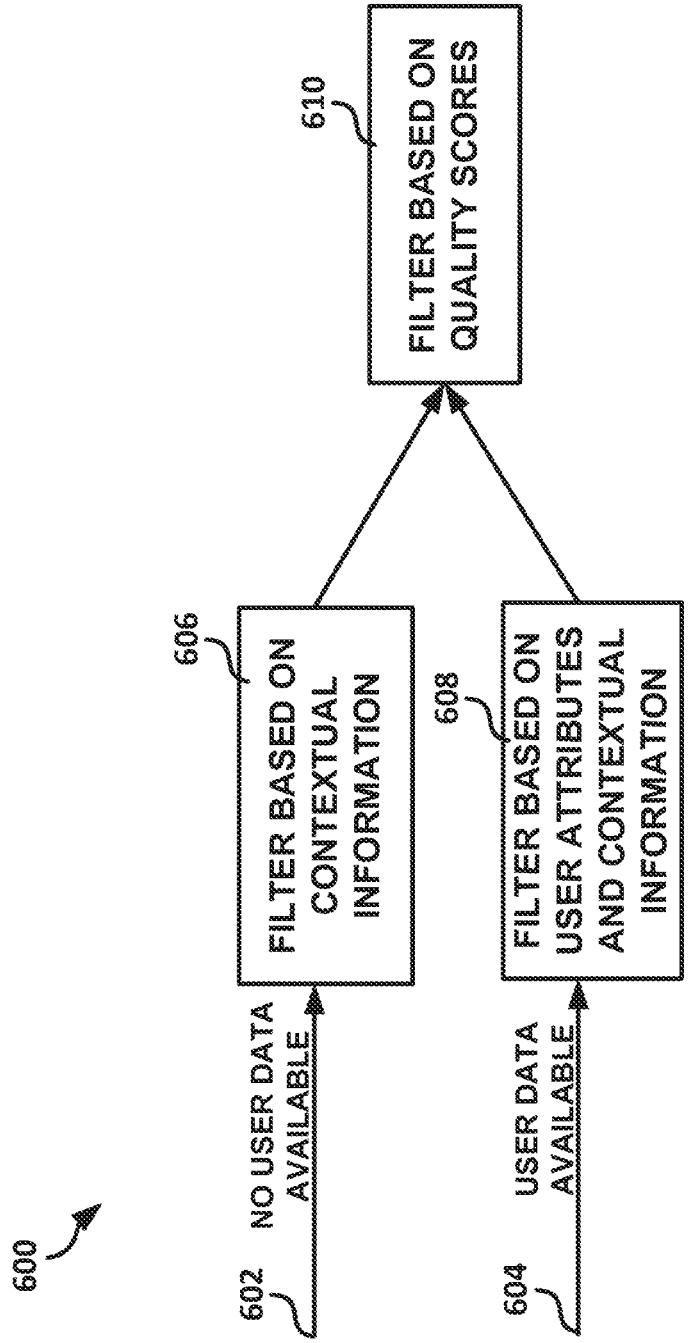
FIG. 6 illustrates, by way of example, a flow diagram of an embodiment of a method of contextual modeling.

The three techniques and variations thereof are discussed and a comparative performance analysis between contextual pre-filtering, contextual post-filtering, and contextual modeling are presented in FIGS. 5, 6, and 7. These techniques are analyzed and some of their performance characteristics are presented. An analysis of prior CARSs is presented with a discussion of some of the drawbacks that can be overcome using one or more of the embodiments discussed herein Conventional CARSs can suffer from data sparseness issues. Data sparseness can be caused when there is little or no information about a user. Some RS s are configured to provide a recommendation of an item listing that is popular when there is little or no information about a user. Thus, some RSs tend to become popularity based, such as can be due to data sparseness. Such systems tend to give bad recommendations when user attributes are not available. Also, such systems can lack in diversity. To help in solving one or more of these issues, in an embodiment, a versatile ranking mechanism (e.g., using the RS 300) is provided that calculates a quality score of various item listings or collections of item listings based on item listing level, collection level, and/or historical performance features of the item listings or collections. Using this ranking, all the item listings are rated independently of the user ratings, contextual information, and user attributes, hence there is no sparseness in information for item listings. Contextual information (such as device type: mobile or desktop etc.) and/or a user's attributes can be used to pre-filter the item listings, post-filter the item listings, or be combined with the quality scores of the collections for better recommendation personalization.

Using the quality score, new item listings or collection of item listings can be recommended to the users with improved accuracy. Filtering (e.g., ranking) potential item listings based on quality scores of item listings or collections can lead to better recommendations. Unlike other approaches, one or more of the approaches discussed herein does not use a popularity base in providing a recommendation. The experimental results discussed show a performance boost and better personalization.

Another challenge with existing RSs is that even if item listings are sold out they may still be recommended. Item listings can sell out quickly. The proposed ranking mechanism(s) can consider item listing age, item listing last update time, and other such features into account to help in preventing recommending an item listing that has sold out. These features of the item listings can be considered in determining the quality score of an item listing. Item listings which are sold out and popular can be ranked lower. An approach discussed herein can refrain from recommending an item listing which is sold out and popular.

An advantage of an approach discussed herein is that it can be built on top of an already existing RS, irrespective of its type. In some RSs, it may be difficult to recommend an item listing to a user when user attributes are unknown. Discussed herein are a variety of mechanisms to provide a recommendation based on contextual information and quality scores of collections so as to provide a recommendation independent of user attributes. Contextual information is available most of the time so recommendations are unlikely to be based on the quality score alone.

In this disclosure, recommendation techniques are discussed in the context of using a random forest classifier technique. While a random forest classifier technique is used as an example technique, other techniques can be used, such as those shown in FIGS. 7, 8, and 9 and discussed herein.

One or more contextual features can be considered in an RS, in one or more embodiments. Contextual information includes device type, operating system (OS), browser, etc. Since contextual information is usually available, imputation may be avoided (i.e. using imputation, where there is data loss or data is not available, data is extrapolated or otherwise generated to fill in an information gap), and over-fitting of the model is avoided. Imputation and over-fitting are some common issues with conventional RSs. Table 1 shows a list of some contextual features that can be considered in providing a recommendation (i.e. a recommendation for an item listing, such as a product for purchase, a video for viewing, a website for viewing, a story for reading, etc.).

TABLE 1

Example Contextual Features
Contextual Features

Visitor Type
Visitor Buyer Segment
Visitor Seller Segment
Demographics
Time
OS Type
Device Type
(Desktop/Mobile/Tablet)
Session Source Type
isOwner Using a random forest classifier technique in an RS (e.g., a personalized and/or context aware RS, or other RS) to rank potential recommendation item listings can help alleviate one or more of the drawbacks of the conventional RSs, such as the RSs and/or drawbacks previously discussed. The ranking mechanism can be integrated with an existing RS to provide a better recommendation experience to a user. A quality score for an item listing or collections of item listings that might be recommended can be calculated using this ranking mechanism and the item listings/collections can be filtered based on the quality score.

An RS as discussed herein can include one or more advantages including: 1) incorporating contextual information can cause better user-engagement. For example, different personalization models for different device-types being used to access a website can help provide a better user experience; 2) new item listings/collections, and those without historical performance can be recommended more accurately; 3) sparseness issues can be reduced by providing a new user with a recommendation based on a quality score of the item listing or collection and/or contextual information; 4) the recommendation can be a good recommendation even if a user's past preference/purchases is not available. In such cases, contextual information can be used in providing the recommendation since contextual information is almost always available; 5) using a random forest classifier for calculating quality scores and leveraging item listing/collections characteristics, users preferences, or contextual information for recommendations can be computationally cheaper than existing context aware techniques; 6) no additional techniques, such as dimensionality reduction ($O(n^2)$), or techniques to deal with sparseness are required; 7) random forest is $O(n*m*\log(n))$, where n is the number of samples and in is the number of decision trees used. This is computationally much cheaper than similarity matching used in CF, which is ($O(n^2)$); 8) there is less dependency on user ratings of item listings. Most of the existing recommendation systems (e.g., Yelp, Netflix) use user ratings, which can cause dependency issues and lead to sparseness; 9) an inherent ranking system to obtain a quality score can be more objective than user (human) rating of item listings/collections; 10) there is no need to deal with regularization to avoid over-fitting; or 11) sold out item listings are not recommended, even if they are popular.

The ranking mechanism (e.g., a quality score as determined by the quality score module 238) for ranking an item listing or a collection can consider item listing characteristics, collections features, historical performance of an item listing, type of author (those who made the collection/item listing), among others. This mechanism can rank old collections and item listings, and can rank new collections and item listings as well. The ranking mechanism (as implemented by the ranking module 304) can be integrated along with contextual information and/or a personalized RS to recommend an item listing or a collection of higher quality (e.g., an item listing or a collection with a higher quality score) in the absence of other user or context information.

The random forest classifier can also be used for generating a personalized recommendation. If a default personalized recommendation model that incorporates users-item listings ratings or users past preferences, etc. for recommendations already exists, then the same model can be integrated with contextual information using a technique or system discussed herein. So, the proposed methods and systems are robust in that they can be added to an existing RS or can be used on their own.

Item listings can be ranked based on a user rating. Sometimes a user-rating is not available from a specific user. Not every website provides a rating system for an item listing or collection of item listings. The eBay Collections website (http://wvvw.ebay.com/cln) from eBay, Inc. of San Jose, California, is such a website. In such cases, instead of using the user rating for an item listing or collection, these item listings or collections can be ranked on popularity (followers, shares, or the like, among others), past purchases, or a combination thereof. A disadvantage to such a ranking is that popular collections become more popular, and even if the item listing is sold out it can still be recommended, as previously discussed. In addition, such ranking generally does not provide recommendations to new collections. To help alleviate these issues, a last-update time or a collection-age of the collection can be considered by a random forest classifier in ranking the item listing or collection of item listings. However, this might lead to recommendations of collections of bad quality, because a collection that was updated recently, does not ensure the collection is of a high quality. Care may be taken not to put too much weight on a last update time, or a user rating or popularity of an item listing or collection.

The ranking, as provided by the random forest classifier can be based on item listing level attributes (e.g., item listing freshness, item listing quality, image quality, and item listing past performance, among others), collection level attributes (e.g., number of item listings, collection age, collection past performance, collection last update time, among others), author level attributes (e.g., type of author, such as celebrities, artists, or professionals, among others) and/or historic performance of the item listing or collection of item listings (e.g., followers, shares, or registrations, among others). Note that some authors are curators (e.g., celebrities, artists, or professionals) and their collections are of very high quality. See Table 2 for a description of example parameters that can be considered in a quality score.

TABLE 2

Some parameters that can be used in determining a quality score

| Category | Features |
| --- | --- |
| 1. Item listings | Item listing Freshness |
| | Item listing Quality |
| | Image Quality |
| | Cover Item listing Quality Cover |
| | Image Quality |
| | Top 5 Mean Item listing Quality |
| | Top 5 Mean Image Quality |
| 2. Collections | Number of Item listings |
| | Collection's Age |
| | Collection's Last Update |
| 3. Historical Performance (3, 7, 15, 30, 45, 60 days) | View Item listings |
| | View Item listing Layer Counts |
| | Follow Counts |
| | Unfollow Counts Share Counts |
| | User Engagement (BBOWAA*) |
| 4. Author | Author Type |
| | Author Buyer Segment Author |
| | Seller Segment |
| | Is Curator (celebrity/paid professional author) |

Given a collection or item listing, a quality score can be defined as the probability of the item listing or collection having user-engagement. Multiple metrics can be used to measure user-engagement. Two metrics are considered here: 1) VI (view item listing: user views item listing in that collection), BBOWAA (Bids, Bins, Offer, Watch counts, Add to cart, or Ask seller a question). Using these metrics a machine-learning based model can determine whether user-engagement will happen or not. Determining the quality score can be considered as a binary classification problem in one or more embodiments, such as where class "1" corresponds to engagement and class "0" corresponds to no-engagement. However, this disclosure is not limited to such a classification, a ternary classification or other classification can be used. For example, a "00" can correspond to no engagement, "01" can correspond to a quick engagement (e.g., a click and view time of less than ten seconds), a "10" can correspond to a regular amount of engagement (e.g., a view time of greater than ten seconds), and a "11" can correspond to a greater than normal amount of engagement (e.g., VI and BBOWAA). The quality score can be calculated offline so that it is ready for use when a user accesses a website.

In the binary classification scheme, the probability with which class "1" is predicted is defined as the quality score. Because the data has randomness (e.g., due to user's behavior), it can be helpful to remove false negatives, false positives, or try to control the variance. An ensemble technique can be used for determining the quality score. Using a random forest classifier for ranking an item listing or collection, a percentage of classifiers that predicted a class "1" can be divided by the total number of all sub-classifiers in the random forest classifier to determine the quality score. So, if 60% of all the sub-classifiers predicted class "1" then the quality score of that collection can be 0.6, for example.

A quality score can be generated for a new collection or item listing, such as by using item listing or collection level attributes. With time, historic performance parameters can be incorporated into the quality score for an item listing or collection. Models can be updated periodically (e.g., daily, hourly, weekly, monthly, etc.), randomly, or on request. Choosing to update often enough, but not too often, can provide enough time for the item listings in most collections to be sold or otherwise changed, and can allow new collections to build some historical information.

To rank an item listing, some of the best features of the item listing can be extracted, by the ranking module 304, using a feature importance technique (e.g., information gain, entropy, random forest, among others). The relative rank of each feature can be determined by obtaining the depth of the random forest tree generated while using each attribute as a decision node. Less depth can imply more importance. Table 2 summarizes some of the features that were considered at the collections level for simulations discussed herein.

A quality of a recommendation can be improved when compared to a conventional RS or a prior personalized RS using one or more of the techniques discussed herein. Also discussed herein is how contextual information can be used to help improve personalized recommendations. In the context of a recommendation, a high quality recommendation is one that a user engages with. An improvement in an RS includes a user engaging with a recommendation with a higher probability, the RS providing the recommendation using fewer computer resources while maintaining or improving the probability a user takes the recommendation, and/or an RS providing the recommendation in less time while maintaining or improving the probability a user takes the recommendation, among others.

FIG. 4 illustrates, by way of example, a flow diagram of an embodiment of a contextual pre-filtering technique 400. In contextual pre-filtering, based on user's context, item listings are already pre-filtered out offline. The item listings can then be further filtered (e.g., ranked) online based on the user attributes and/or the quality scores of the item listings. Those item listings which are relevant to the context in the current session are reflected and others are pre-filtered out. For example, users tend to engage more on tablets, laptops, and mobile phones while they tend to purchase more using a desktop. Also, users are generally more active on desktops during the day and morning time and engage through tablets and mobile in evening and night. The item listings can be filtered (e.g., using the database 124 and the database server 126) based on the context of the user access. After the item listings are filtered based on the contextual information then the item listings can be filtered again based on: (i) a user's attributes at operation 406 (e.g., personalized search results, purchase history, browsing history, demographics, or other attributes) and/or (ii) based on quality scores at operation 404. If the user attributes are not available (which can be determined at operation 408 or operation 410), then recommendations can be solely based on quality scores 404 and pre-contextual filtering 402. If user attributes are available for the user, the item listings and collections can be filtered based on the user attributes at 406 and then filtered based on the quality score 404.

This approach works well online, that is, in the current session. Pre-filtering tends to lead to local models instead of a single global model. Every context (and related contexts) might end up being one relatively small local model. A drawback of this approach is sparseness, since, after pre-filtering is performed, there may be no training data (e.g., item listings) available for that context. A bad recommendation could be provided in such a situation. Pre-filtering also does not scale well with many contextual variables. One or more of the item listings can be recommended from the item listings or collections remaining after all the filtering.

FIG. 5 illustrates, by way of example, a flow diagram of an embodiment of a contextual post-filtering technique 500. Unlike contextual pre-filtering, as shown in FIG. 4, item listings are filtered based on contextual information in the post-process (i.e. at operation 310) in contextual post-filtering technique 500. Whether user attribute data is available can be determined at 240 and 304. The item listing(s) or collection(s) can be filtered based on the quality score at 306 or 308. If user data is available the item listing(s) or collection(s) can be filtered based on user attributes and the quality score at 308. The filtering of the item listings based on the quality score and/or the attribute data can be done offline or online, such as by the database 124 or the database server 126 or the ranking module 304 and/or the quality score module 238. If no user data is available then the user attributes are not available and the item listing(s) are filtered based on quality scores at operation 306. After filtering based on quality score and/or user attributes, the item listing(s) or collection(s) can be filtered based on contextual information 310, such as online One or more item listings or collections can be recommended based on the item listings or collections remaining after all the filtering.

In many cases post-filtering out-performs pre-filtering in providing more relevant results and also in terms of execution time. Post-filtering also integrates well with any existing RS. This allows an already existing RS to be used offline for personalization. If user's attributes are not available or if the user is new, then the initial filtering can be done using only quality score at operation 306. Generally, a number of contextual features are limited and much less than those incorporated in a personalized recommendation, and personalized recommendations are generally pre-calculated offline, which gets updated for every new session.

FIG. 6 illustrates, by way of example, a flow diagram of an embodiment of a contextual modeling technique 600. In contextual modeling, contextual features are integrated with those used for personalization (e.g., user attributes). The models are trained (e.g., the item listing(s) or collection(s) are filtered) with all the features: contextual and non-contextual. Contextual modeling is computationally expensive when compared to contextual post-filtering and contextual pre-filtering.

At operations 402 and 404, it can be determined whether user attribute data is available. If user attribute data is not available, item listings can be filtered based on only the contextual information at operation 406. The item listings can further be filtered based on a quality score at operation 410. At operation 408, item listings can be filtered based on user attributes and contextual information. The filtered item listings after performing operations 408 or 406 can be filtered based on quality scores at operation 410. One or more item listings or collections remaining after all the filtering can be recommended to the user.

As used herein, "filter" means to rank and/or remove, such as by using a random forest classifier or other technique and/or comparing the rank to a threshold to determine if the item listing is to be removed. In using a random forest classifier, changing the definition of one or more nodes generally changes the forest, generally leading to different numbers of sub-classifiers including an engagement prediction from the user. Thus, the definition of the nodes can change the predicted outcome and the final recommendation. The result of a filter process can include a list or set of one or more item listings or collections of item listings. The result can include a relative rank number that can indicate an item listing or collection is generally more or less likely to cause a user to engage with the item listing or collection.

Contextual information can change often. When modeling, it should be considered that a recommendation adheres to the context in action. Since a user might be involved in different kinds of context in different sessions, it is difficult to train the model offline according to all possible contexts for every session in real-time (online) Therefore, in contextual modeling some heuristics are generally applied. A model is generally trained with those contexts that are most common for that user. Thus, a user might use a desktop and a tablet, but while training that device type can be chosen which is most frequent for that user.

Incorporating every combination of context for a user becomes computationally expensive and can cause overfitting. Contextual modeling can work well with respect to every session, when the model is trained offline. The contextual models are generally static models, confined to a session. What is recommended in a next session can be pre-defined or determined after a session. The model can be refreshed before the next session to determine the next recommendation.

The historical performance of item listings/collections for different periods was considered. Historical performance of collections in past three days, seven days, fifteen days, thirty days, forty-five days, and sixty days were considered. Models with seven days historical performance gave better accuracy than others. The best duration to refresh the models being tested was about seven days. Seven days gave enough time for new collections/item listings to mature, to know the performance of old collections/item listings, and allow collections/item listings to sell out.

Various classification techniques were used to obtain whether engagement would happen or not. A binary classification technique was used. Although, most of the classification techniques that were chosen gave good results, a random forest classification technique out-performed all other approaches. A probability of a user engaging with an item listing or collection was determined from the models; this probability is called the quality score of that item listing or collection. Tables 3, 4, and 5 (See FIGS. 5, 6, and 7, respectively) depict the performance of different models. The analysis was performed at collections level and at session level. A comparison of the performance of three different paradigms of context aware recommendations is presented.

The analysis was conducted at session level and collection (of item listings) level. Session level information was collected in response to a user visiting a collection during a session. A session is a user visiting a website and visiting an item listing in a collection.

Collection level information is the aggregated data (such as performance (e.g., sales, user-engagement, or the like), item listing quality, image quality, etc.) for all the visits that happened in a collection. So, in a given time period there could be multiple visits in the same collection from the same user. Collection and item listing feature values are dynamic and can change frequently. Analysis was performed on around twelve million visits, five hundred thousand collections, and thirteen million item listings.

Collection level data can be used by the ranking module 304 to obtain a quality score of an item listing or a collection. The collection level data can also be integrated with user's attributes to obtain a personalized recommendation. The techniques herein determine probability of a user engaging with an item listing assuming an item listing is shown to a user. If the probability is greater than a threshold, (e.g., 0.5 or other threshold), then the collection can be classified as class "1". At session level, a predicted order of a user visiting a plurality of the collections (e.g., all the collections) was calculated, given some contextual features and users past preferences (if present). Integrating quality score of collections with the personalization and contextual models yielded better results than other techniques.

Since e-Commerce business is dependent on recommendations and such organizations tend to develop their own RS, it is very difficult to replace them. In such cases, the ranking system, which can be used to obtain the quality scores can be used in addition to the already existing recommendation score. Quality scores, contextual data, and already existing personalized recommendations (if present) can deliver a much better experience for a user as compared to CB, CF, or a combination thereof.

FIG. 7 illustrates, by way of example, a table 700 depicting simulation results of a contextual modeling recommendation vs. context-less recommendation at the collections level. FIG. 7 shows a performance boost, when incorporating context (i.e. contextual modeling) in the models at collections level. There is an improvement of up to 19% in the area under ROC curve, also the RMSE is reduced by up to about 37% using the random forest classifier technique. The added computational cost of the random forest classifier is relatively small.

FIG. 8 illustrates, by way of example, a table 800 depicting simulation results of a contextual modeling recommendation vs. context-less recommendation at the session level. Less improvement was observed at session level when compared to recommendations at collections level. There was up to about 12% improvement over using a stochastic gradient descent method and about a 10% improvement using a random forest classifier in the area under ROC. A decrease of 7% RMSE is obtained with these models.

It is relatively hard to predict the engagement of users at session level when compared to collections level. If a collection is good, then it tends to have more engagement, however an active user might not engage with all the collections. Adding contextual information improves the performance.

FIG. 9 illustrates, by way of example, a table 900 depicting simulation results of a contextual pre-filtering and context post-filtering. In the study pre-filtering gave similar performance results as contextual modeling while post-filtering gave better performance and in less time.

Figure 10:
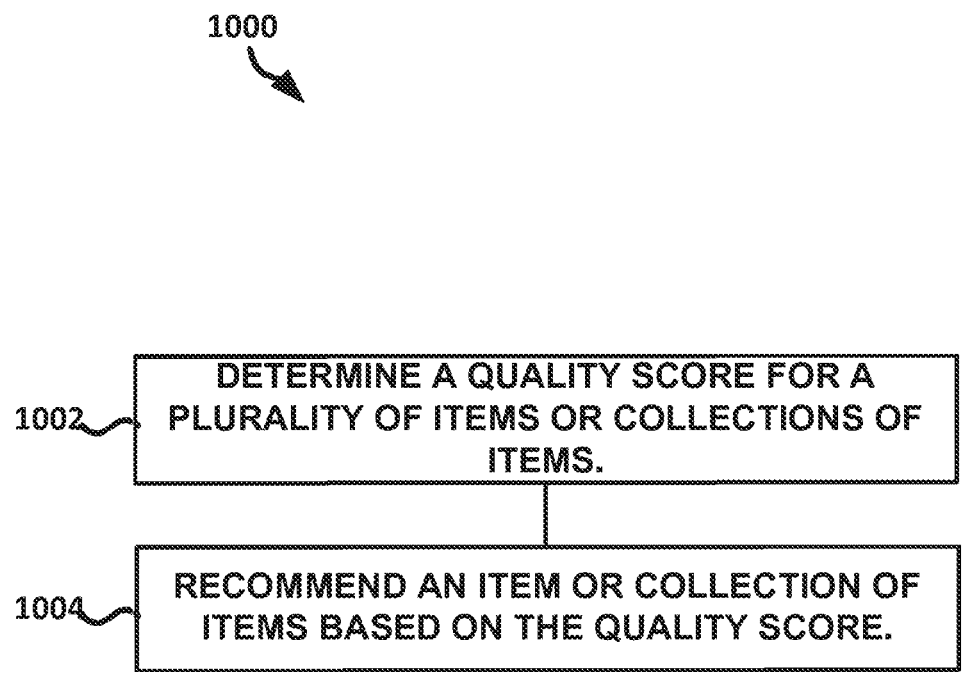
FIG. 10 illustrates, by way of example, a flow diagram of an embodiment of a method of providing a recommendation.

FIG. 10 illustrates, by way of example, a flow diagram of an embodiment of a method 1000. The method 1000 can be implemented using the system 300, the contextual information module 236, and/or one or more other modules, databases, or database servers discussed herein. The method 1000 as illustrated includes: determining, using the quality score module 238, a quality score for a plurality of item listings or collections of item listings, at operation 1002; and recommending, using a recommendation module 240, an item listing or collection of item listings based on the quality score, at operation 1004. The quality score can be determined independent of a user's attributes and independent of contextual information. The contextual information can correspond to details of the user's access to a website. The operation at 1004 can include recommending an item listing or collection of item listings to a user based on one or more of the quality score, user attributes, and the contextual information.

The operation at 1002 can include determining the quality score using a random forest classifier, a logistic regression, a stochastic gradient descent, a Gaussian naïve Bayes, an Adaboost, another technique, or a combination thereof. The method 1000 can include comparing a quality score to a threshold. In one or more embodiments, the item listing or collection associated with the quality score can be recommended only if the quality score is greater than the threshold. The contextual information can include at least one of a type of device the user is using to access the website, a user type, a user buyer segment, a user seller segment, a user demographic, a time of access, an operating system type of the device of the user, a session source type, and whether the user is an owner of an item listing for sale on the website, among others.

The method 1000 can include contextual pre-filtering, contextual post-filtering, or contextual modeling the item listings or collection of item listings before recommending the item listing or collection of item listings. Contextual pre-filtering can include pre-filtering the item listings or collections based on the contextual information, determining whether user attributes are available for the user. Contextual pre-filtering can include, in response to determining user attributes are available, further filtering the pre-filtered item listings or collections based on the user attributes and filtering the further filtered item listings or collections based on the determined quality score for the recommended item listing or collection of item listings to create a first filtered set and wherein recommending an item listing or collection of item listings to the user includes choosing an item listing from the first filtered set. Contextual pre-filtering can include, in response to determining the user attributes are not available, further filtering the pre-filtered item listings or collection based on the quality scores to create a second filtered set and wherein recommending an item listing or collection of item listings to the user includes choosing an item listing from the second filtered set.

Contextual post-filtering can include determining if user attributes are known. Contextual post-filtering can include, in response to determining user attributes are not known, providing the recommendation using the quality score filtered by the contextual information. Contextual post-filtering can include, in response to determining the user attributes are known, recommending the item listing or collection of item listings to a user chosen based on a quality score modified filtered by the user attributes and then filtered by the contextual information.

Contextual modeling can include determining if user attributes are known. Contextual modeling can include, in response to determining user attributes are not known, providing the recommendation using the contextual information filtered by the quality score. Contextual modeling can include, in response to determining the user attributes are known, recommending the item listing or collection of item listings to a user chosen based on user attributes and contextual information and then filtered by the quality score.

A random forest classifier technique is an ensemble machine learning technique for classification that includes the construction of a plurality of decision trees at training time. Training for a random forest generally uses bootstrap aggregating to a tree learner. Given training data, $X=x_1, \ldots, Xn$ with response $Y=y1, \ldots, Yn$, the training selects random samples of the training data, X and fits the sample to a regression tree on the selected random samples. A prediction for a new sample can be made by averaging the predictions from the individual regression trees on the new sample or by taking a majority vote on the decision trees (e.g., a majority of "1" or a majority of "O"). A random forest classifier uses a modified tree learning technique that selects, at each node ("split") a random subset of the branch are chosen. For each branch a random value can be selected in the node's range, the best random value can be chosen as the node.

In the context of providing an item listing or collection recommendation, each item listing or collection can be considered a variable and the "importance" (e.g., quality score or relative rank) of the variable can be determined using the random classifier technique. First, a random forest can be fit to the data. Error in fitting can be recorded. To measure the importance of a variable, the values of the variable are permuted among the training data and the error is computed again the altered data set. The importance of the variable is computed by averaging the difference in error before and after permuting the variable. The importance can be normalized by the standard deviation of the differences. The higher the importance the number, the higher the rank of the variable.

A logistic regression technique includes a binomial or multinomial regression. Logistic regression can be used to predict the probability that an outcome is true based on a value of a variable. In logistic regression it is assumed that there are observed data points, N. Each data point of N consists of features and output Y. The goal of the technique is to determine a relationship between the features and the outcome. For a latent (unknown) variable, a distribution of the latent variable can be determined based on a predictor function and a random error variable that is distributed according to the logistic regression model.

Logistic regression is a conditional distribution of the output Y, given the features, X. The logistic regression can include determining this probability based on two coefficients. One coefficient is determined by setting a linear regression predictor to zero and the other is a regression coefficient that regulates how fast a probability changes with a changing feature. The regression coefficient can be selected as the value that minimizes the sum of squares.

A stochastic gradient descent technique is an optimization method for minimizing an objective function that is written as a sum of differentiable functions. In the case of providing a recommendation A Gaussian naïve Bayes technique includes a probabilistic classifier with independence assumptions between features. That is one feature contributes independently to a probability that the feature is a member of a class, regardless of the presence or absence of other features. Features can be classified into categories, such as relevant to the user or not relevant to the user, for example. Training data can be used to determine a likelihood of influencing a user by providing a recommendation. Training data can be updated periodically to help in improving the recommendation technique.

An Adaboost technique is a method of training a boosted classifier. A boosted classifier is a weak learner that returns a real value where the sign of the real value indicates the predicted class and the magnitude of the weak learner gives the confidence in that classification.

In general these techniques are linear regression techniques that attempt to fit a set of features to a user profile. The recommendation that minimizes an error between the features and the profile can be chosen and presented to the user. The fitting can consider quality score, contextual features, and/or attributes, in a variety of different orders.

Example Mobile Device

Figure 11:
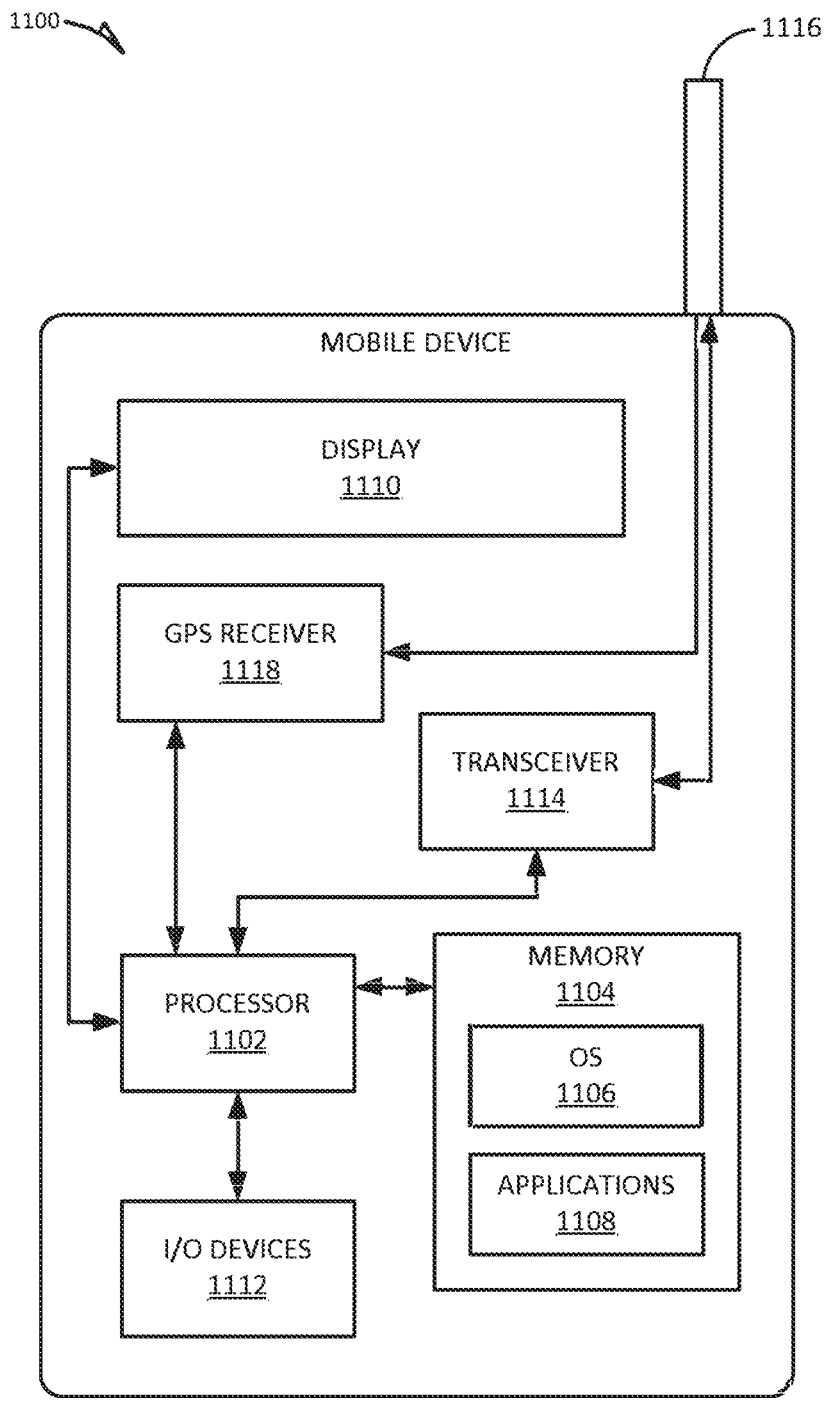
FIG. 11 illustrates, by way of example, a block diagram of an embodiment of a mobile device.

FIG. 11 is a block diagram illustrating a mobile device 1100, according to an example embodiment. The mobile device 1100 can include the client machine 110 and//or 112. The mobile device 1100 may include a processor 1102. The processor 1102 may be any of a variety of different types of commercially available processors 1102 suitable for mobile devices 1100 (for example, an XScale architecture microprocessor, a microprocessor without interlocked pipeline stages (MIPS) architecture processor, or another type of processor 1102). A memory 1104, such as a random access memory (RAM), a flash memory, or other type of memory, is typically accessible to the processor 1102. The memory 1104 may be adapted to store an operating system (OS) 1106, as well as application programs 1108, such as a mobile location enabled application that may provide LBSs to a user. The processor 1102 may be coupled, either directly or via appropriate intermediary hardware, to a display 11010 and to one or more input/output (I/O) devices 1112, such as a keypad, a touch panel sensor, a microphone, and the like. Similarly, in some embodiments, the processor 1102 may be coupled to a transceiver 1114 that interfaces with an antenna 1116. The transceiver 1114 may be configured to both transmit and receive cellular network signals, wireless data signals, or other types of signals via the antenna 1116, depending on the nature of the mobile device 1100. Further, in some configurations, a GPS receiver 1118 may also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner In one or more embodiments, one or more computer systems (e.g., a standalone, client or server computer system) or one or more processors 1102 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1102 or other programmable processor 1102) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1102 configured using software, the general-purpose processor 1102 may be configured as respective different hardware-implemented modules at different times. Software may accordingly configure a processor 1102, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some embodiments, comprise processor-implemented modules.

Similarly, the methods described herein may be at least partially processor-implemented. For example, at least some of the operations of a method may be performed by one or processors 1102 or processor-implemented modules. The performance of certain of the operations may be distributed among the one or more processors 1102, not only residing within a single machine, but deployed across a number of machines. In some example embodiments, the processor 1102 or processors 1102 may be located in a single location (e.g., within a home environment, an office environment or as a server farm), while in other embodiments the processors 1102 may be distributed across a number of locations.

The one or more processors 1102 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APis).

Electronic Apparatus and System

One or more embodiments may be implemented in digital electronic circuitry, or in computer hardware, firmware, software, or in combinations of them. Example embodiments may be implemented using a computer program product (e.g., a computer program tangibly embodied in an information carrier, such as in a machine-readable medium for execution by, or to control the operation of a data processing apparatus, such as a programmable processor 1102, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In one or more embodiments, operations may be performed by one or more programmable processors 1102 executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 1102), or a combination of permanently and temporarily configured hardware may be a design choice. Below are set out hardware (e.g., machine) and software architectures that may be deployed, in various example embodiments.

Figure 12:
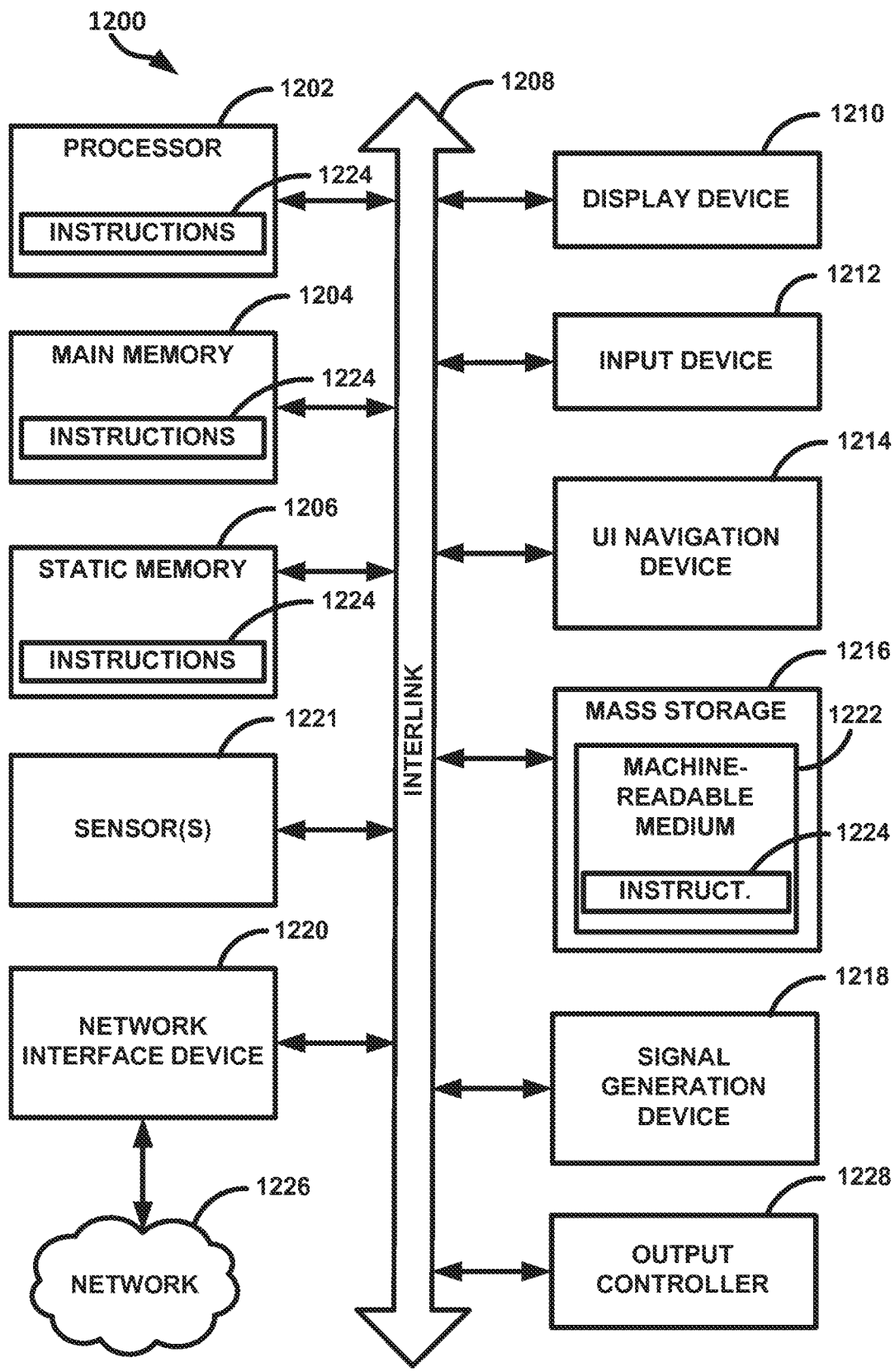
FIG. 12 illustrates, by way of example, an embodiment of a machine that may be used to perform one or more techniques (e.g., methods) discussed herein.

FIG. 12 is a block diagram illustrating an example computer system machine 1200 upon which any one or more of the techniques herein discussed can be run. In one or more embodiments, the recommendation module 240, contextual information module 236, quality score module 238, and/or the ranking module 304 can include one or more item listings of computer system 1200. Computer system 1200 can be embodied as a computing device, providing operations of the recommendation module 240, contextual information module 236, quality score module 238, and/or the ranking module 304 or any other processing or computing platform or component described or referred to herein. In alternative embodiments, the machine operates as a stand-alone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaining console, a Personal Digital Assistant (PDA), a mobile telephone or Sinai iphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Implementing techniques using computer processors and other logic can lead to automated camera condition change detection (e.g., that does not include human interference).

Example computer system 1200 can include a processor 1202 (e.g., a central processing unit (CPU), a graphics processing unit (GPU) or both), a main memory 1204 and a static memory 1206, which communicate with each other via an interconnect 1208 (e.g., a link, a bus, etc.). The computer system 1200 can further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are a touch screen display. The computer system 1200 can additionally include a storage device 1216 (e.g., a drive unit), a signal generation device 1218 (e.g., a speaker), an output controller 1228, or a network interface device 1220 (which can include or operably communicate with one or more antennas 1230, transceivers, or other wireless communications hardware), or one or more sensors 1221, such as a GPS sensor, compass, location sensor, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor 1202 during execution thereof by the computer system 1200, with the main memory 1204, static memory 1206, or the processor 1202 also constituting machine-readable media. The processor 1202 configured to perform an operation can include configuring instructions of a memory or other machine-readable media coupled to the processor, which when executed by the processor, cause the processor 1202 to perform the operation.

While the machine-readable medium 1222 is illustrated in an example embodiment to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for contextual filtering, comprising:
one or more hardware processors; and
a non-transitory machine-readable medium storing instructions that, when executed by the one or more hardware processors, cause the one or more hardware processors to perform operations comprising:
generating contextual information for a client device used to access a website hosting a plurality of item listings by analyzing data traffic between the client device and the website, the contextual information independent of user attributes that are inherent to a user;
selecting one or more item listings from the plurality of item listings by:
filtering the plurality of item listings based on the contextual information, the filtering producing a subset of pre-filtered item listings of the plurality of item listings;
generating, using a machine-learning model, quality scores for respective item listings of the subset of pre-filtered item listings based on respective item listing attributes that are independent of the contextual information and independent of the user attributes; and
further filtering the subset of pre-filtered item listings based on the quality scores; and
causing display of the one or more selected item listings.

2. The system of claim 1, wherein selecting the one or more item listings from the plurality of item listings further comprises:
determining that the user attributes are available; and
responsive to determining that the user attributes are available, further filtering the subset of pre-filtered item listings based on the user attributes.

3. The system of claim 1, wherein the respective item listing attributes comprise at least one of:
an item listing freshness associated with an item listing included in a collection of item listings, the item listing freshness indicating how recently the item listing was posted for sale;
an item listing quality associated with the item listing;
an image quality associated with the item listing; or
a past performance of the item listing.

4. The system of claim 1, wherein further filtering the subset of pre-filtered item listings based on the quality scores comprises:
comparing the quality scores for the respective item listings of the subset of pre-filtered item listings to a threshold; and
filtering out each item listing having a quality score less than the threshold.

5. The system of claim 1, wherein the contextual information comprises at least one of a browser type used by the client device, an operating system used by the client device, a device type of the client device, and a time of access of the website by the client device.

6. The system of claim 1, wherein filtering the plurality of item listings based on the contextual information comprises:
ranking the plurality of item listings based on the contextual information; and
removing a particular item listing from the plurality of item listings based on a rank of the particular item listing.

7. The system of claim 1, wherein the quality scores are further based on collection level attributes of the respective item listings of the subset of pre-filtered item listings, the collection level attributes including attributes associated with a respective collection of item listings to which a given item listing is grouped based on a common theme.

8. The system of claim 1, wherein the machine-learning model includes a random forest classifier generated while using the respective item listing attributes as decision nodes, and wherein the generating, using the machine-learning model, the quality scores for the respective item listings of the subset of pre-filtered item listings based on the respective item listing attributes that are independent of the contextual information and independent of the user attributes comprises:
generating relative ranks of the respective item listing attributes based on a depth of a respective decision node of the random forest classifier; and
determining the quality scores for the respective item listings of the subset of pre-filtered item listings based on the relative ranks of the respective item listing attributes.

9. The system of claim 1, wherein the machine-learning model includes a random forest classifier in an ensemble technique with a binary classification scheme, and wherein the generating, using the machine-learning model, the quality scores for the respective item listings of the subset of pre-filtered item listings based on the respective item listing attributes that are independent of the contextual information and independent of the user attributes comprises:
generating the quality scores based on a percentage of sub-classifiers in the random forest classifier predicting a first class of the binary classification scheme for the respective item listing attributes.

10. A method for contextual filtering, comprising:
generating contextual information for a client device used to access a website hosting a plurality of item listings by analyzing data traffic between the client device and the website, the contextual information independent of user attributes that are inherent to a user;
selecting one or more item listings from the plurality of item listings by:
filtering the plurality of item listings based on the contextual information, the filtering producing a subset of pre-filtered item listings of the plurality of item listings;
generating, using a machine-learning model, quality scores for respective item listings of the subset of pre-filtered item listings based on respective item listing attributes that are independent of the contextual information and independent of the user attributes; and
further filtering the subset of pre-filtered item listings based on the quality scores; and
causing display of the one or more selected item listings.

11. The method of claim 10, wherein selecting the one or more item listings from the plurality of item listings further comprises:
determining that the user attributes are available; and
responsive to determining that the user attributes are available, further filtering the subset of pre-filtered item listings based on the user attributes.

12. The method of claim 10, wherein further filtering the subset of pre-filtered item listings based on the quality scores comprises:
comparing the quality scores for the respective item listings of the subset of pre-filtered item listings to a threshold; and
filtering out each item listing having a quality score less than the threshold.

13. The method of claim 10, wherein filtering the plurality of item listings based on the contextual information comprises removing a particular item listing from being selected as the one or more item listings using a random forest classifier and the contextual information.

14. The method of claim 10, wherein filtering the plurality of item listings based on the contextual information comprises:
ranking item listings of the plurality of item listings based on the contextual information; and
comparing ranks of the item listings of the plurality of item listings to a threshold value to determine whether to remove a particular item listing from being selected as the one or more item listings.

15. The method of claim 10, wherein the contextual information comprises one or more of a browser type used by the client device, an operating system used by the client device, a device type of the client device, and a time of access of the website by the client device.

16. A non-transitory machine-readable medium storing instructions that, when executed by one or more hardware processors, cause the one or more hardware processors to perform operations comprising:
generating contextual information for a client device used to access a website hosting a plurality of item listings by analyzing data traffic between the client device and the website, the contextual information independent of user attributes that are inherent to a user;
selecting one or more item listings from the plurality of item listings by:
filtering the plurality of item listings based on the contextual information, the filtering producing a subset of pre-filtered item listings of the plurality of item listings;
generating, using a machine-learning model, quality scores for respective item listings of the subset of pre-filtered item listings based on respective item listing attributes that are independent of the contextual information and independent of the user attributes; and
further filtering the subset of pre-filtered item listings based on the quality scores; and
causing display of the one or more selected item listings.

17. The non-transitory machine-readable medium of claim 16, wherein selecting the one or more item listings from the plurality of item listings further comprises:
determining that the user attributes are available; and
responsive to determining that the user attributes are available, further filtering the subset of pre-filtered item listings based on the user attributes.

18. The non-transitory machine-readable medium of claim 16, wherein the respective item listing attributes comprise an item freshness indicating how recently a corresponding item listing was posted for sale.

19. The non-transitory machine-readable medium of claim 16, wherein the contextual information comprises at least one of a device type, a browser, or a time associated with the data traffic between the client device and the website over a network.

20. The non-transitory machine-readable medium of claim 16, wherein filtering the plurality of item listings based on the contextual information further comprises:
tagging item listings of the plurality of item listings to indicate whether they are for user engagement or purchase; and
ranking the item listings based on a number of tags associated with a respective item listing that matches the contextual information.

* * * * *